ial No. 367,078

United States Patent Office 2,694,092
Patented Nov. 9, 1954

2,694,092

CONJUGATED DIACETYLENIC DIHYDROPEROXIDES

Nicholas A. Milas, Belmont, Mass.

No Drawing. Application July 9, 1953,
Serial No. 367,078

5 Claims. (Cl. 260—610)

In application Serial No. 248,090, filed September 24, 1951, now United States Patent No. 2,670,384, I have described a group of acetylene peroxides characterized by having at least one tertiary carbon atom having a peroxy group and an acetylenic group attached thereto.

I have now found that acetylenic peroxides of this group having two acetylenic linkages in conjugate relation are useful as catalysts in a wide variety of polymerization reactions including polymerization reactions for the solidification of soils such as the polymerization of calcium acrylate in admixture with soils.

Although the new compounds of the invention are relatively stable under ordinary conditions they are highly sensitive to shock and can be easily detonated with a blasting cap. Owing to their unsaturation they have a very great potential energy and when exploded they have a much greater brisance than TNT.

The following specific examples are illustrative of the methods and products of the invention:

EXAMPLE 1

2,7-dimethyl-3,5-octadiyn-2,7-dihydroperoxide (I)

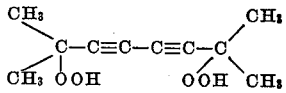

In to a cold (0°) well-stirred mixture of hydrogen peroxide (85.5 g. of 48%) and sulfuric acid (144 g. of 95.5%) in a tall 400 cc. beaker is added, in small portions, over a forty-five minute period, 50 g. (0.3 mole) of 2,7-dimethyl-3,5-octadiyn-2,7-diol, M. P. 131° C. The mixture is stirred at 0±5° C. for three hours longer, then diluted with an equal volume of a saturated solution of ammonium sulfate and extracted with ether. The ether extract is dried over magnesium sulfate, filtered and the ether removed under reduced pressure; yield of the crude peroxide, 53 g. This product recrystallized from water-ethanol mixtures gives crystalline peroxide, M. P. 95–96.5° C.

EXAMPLE 2

3,8-dimethyl-4,6-decadiyn-3,8-dihydroperoxide (II)

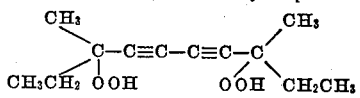

Into a cold (0°) well-stirred mixture of 14.2 g. (0.20 mole) of 48% hydrogen peroxide and 24.0 g. of 95.5% sulfuric acid is added 50 cc. of reagent grade benzene mixed with 10 cc. of anhydrous ethyl ether. The temperature is maintained at 5–10° C. and 2.35 g. (0.012 mole) of 3,8-dimethyl-4,6-decadiyn-3,8-diol, M. P. 73–76° C. (mixed isomers) is added in single portion. The temperature is kept below 10° C. for the first ten minutes, then allowed to rise to room temperature (25° C.). The whole mixture is stirred for one hour longer, after which time all solid has dissolved. An equal volume of saturated ammonium sulfate is then added, the mixture stirred for a little while longer and the benzene-ether layer separated. The non-aqueous layer is extracted once with saturated ammonium sulfate then neutralized with magnesium carbonate. Filtration and removal of the solvent under reduced pressure at room temperature leaves 2.5 g. (91% yield) of a yellowish oil which analyzes for 12.0% active oxygen (85% of theory). Most of this oil crystallizes after standing 2–3 days at −4° C. By dissolving the oil in a small amount of benzene, adding a little pentane, and seeding in the cold (−4° C.) with a crystal of the hydroperoxide, a colorless crystalline product is obtained, M. P. 44–45.5° C.

EXAMPLE 3

7,7-dicyclohexyl-7,8'-butadiyn-6,6'-dihydroperoxide (III)

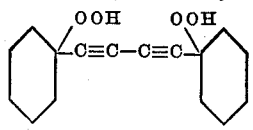

To a cold mixture, (0° C.) of 14.2 g. (0.20 mole) of 48% hydrogen peroxide and 24 g. of 95.5% sulfuric acid is added a mixture of 60 cc. benzene and 10 cc. anhydrous ether. The temperature is maintained at 5–10° C. To this mixture is then added with rapid stirring 4.92 g. (0.20 mole) of 7,7'-dicyclohexyl-7,8'-butadiyn-diol-6,6', M. P. 173° C. The reaction temperature is then allowed to rise to room temperature (25° C.), and after one hour of stirring, the solid has completely dissolved. Stirring is continued for an additional hour, then the non-aqueous layer is separated and washed with a saturated solution of ammonium sulfate, followed by neutralization with magnesium carbonate and drying over magnesium sulfate. When the solvent is removed, 4.5 g. (81% yield) of a thick, yellowish oil remains which crystallizes into a white solid upon seeding with a few crystals of the peroxide. After washing with pentane and drying at room temperature, this product melts at 91.5–93° C. (dec.) and analyzes 94% pure. For further purification this product is recrystallized from benzene-pentane mixture at −4° C. into colorless needles, M. P. 96–97° C. (dec.).

EXAMPLE 4

2,4-hexadiyn-1,6-dihydroperoxide (IV)

$$HOOCH_2-C\equiv C-C\equiv C-CH_2OOH$$

Into a cold (0° C.) well-stirred mixture of hydrogen peroxide (2.8 g. of 48%) and sulfuric acid (4.8 g. of 95.5%), 1.5 g. (0.014 mole) of 2,4-hexadiyndiol-1,6, M. P. 112–113°, is added in small portions. Stirring is continued for three hours longer at 1–5° C., then the product is isolated in the manner followed under Examples 1, 2 and 3. When the ether is removed under reduced pressure a viscous oil (1.5 g.) is obtained which contains about 30% of the expected dihydroperoxide. Attempts to purify this product by crystallization have failed because of its relative instability.

The structure of the peroxides has been further established by complete hydrogenation and by infrared spectra.

I claim:

1. Conjugated diacetylenic dihydroperoxides of the general formula

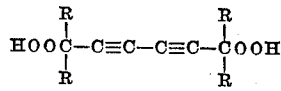

wherein the R's are selected from hydrogen, alkyl groups and hydrocarbon chains forming a cycloalkyl ring.
2. 2,7-dimethyl-3,5-octadiyn-2,7-dihydroperoxide.
3. 3,8-dimethyl-4,6-decadiyn-3,8-dihydroperoxide.
4. 7,7-dicyclohexyl-7,8'-butadiyn-6,6-dihydroperoxide.
5. 2,4-hexadiyn-1,6-dihydroperoxide.

References Cited in the file of this patent

UNITED STATES PATENTS

| Number | Name | Date |
|---|---|---|
| 2,670,384 | Milas | Feb. 23, 1954 |